(12) United States Patent
Williams (10) Patent No.: US 9,555,373 B2
(45) Date of Patent: Jan. 31, 2017

(54) PROCESS OF SUPPLYING WATER OF CONTROLLED SALINITY (71) Applicant: BP Exploration Operating Company Limited, Middlesex (GB)

(72) Inventor: John Dale Williams, Buckinghamshire (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 0 days.

(21) Appl. No.: 14/560,681

(22) Filed: Dec. 4, 2014

(65) Prior Publication Data

US 2015/0083656 A1 Mar. 26, 2015

Related U.S. Application Data (62) Division of application No. 13/519,057, filed as application No. PCT/GB2011/000032 on Jan. 11, 2011.

(30) Foreign Application Priority Data

Jan. 14, 2010 (EP) ..................... 10250063

(51) Int. Cl.
*B01D 61/02* (2006.01)
*B01D 61/12* (2006.01)
(Continued)

(52) U.S. Cl.
CPC ............ *B01D 61/022* (2013.01); *B01D 61/06* (2013.01); *B01D 61/12* (2013.01); *B01D 61/58* (2013.01);
(Continued)

(58) Field of Classification Search
CPC ... B01D 61/022; B01D 61/025; B01D 61/027; B01D 61/58; B01D 63/00; B01D 2317/04; B01D 2317/06; B01D 2317/08; B01D 2313/18; B01D 2313/10; B01D 2313/105; B01D 2313/12; B01D 2313/125; B01D 2313/19; B01D 2313/243; B01D 2313/246; C02F 1/44; C02F 1/441; C02F 1/442; C02F 9/00; C02F 2201/005; C02F 2201/007

See application file for complete search history.

(56) References Cited

U.S. PATENT DOCUMENTS 4,397,661 A * 8/1983 King et al. .................... 96/8
5,405,528 A * 4/1995 Selbie et al. ................ 210/232
(Continued)

FOREIGN PATENT DOCUMENTS

GB 1 520 877 A 8/1978
WO WO 02/12675 A1 2/2002
(Continued)

OTHER PUBLICATIONS

Lai et al. Ft. Lauderdale 12-MGD water treatment plant: Double hybrid RO and NF design. AWWA 10th Biennial Membrane Technology Conference & Exposition. Memphis, TN, Mar. 15-19, 2009, 12 pages.*

(Continued)

*Primary Examiner* — Katherine Zalasky
(74) *Attorney, Agent, or Firm* — Nixon & Vanderhye P.C.

(57) ABSTRACT

Desalination plant containing a plurality of membrane trains each having a plurality of RO membrane units and a plurality of NF membrane units. The ratio of RO membrane units to NF membrane units in each membrane train is in the range of 2:1 to 40:1, and each membrane train is provided with (a) a feed line for a source water that divides to provide a feed line for the RO membrane units and a feed line for the NF membrane units, (b) a permeate line for the RO membrane units and a permeate line for the NF membrane units (Continued)

that combine to provide an injection water line; (c) a retentate line for the RO membrane units and a retentate line for the NF membrane units; and (d) a flow controller and pressure let-down valve on the NF feed line.

22 Claims, 3 Drawing Sheets (51) Int. Cl.
*B01D 61/58* (2006.01)
*C02F 1/44* (2006.01)
*C02F 9/00* (2006.01)
*B01D 61/06* (2006.01)
*B01D 63/12* (2006.01)
*C02F 101/10* (2006.01)
*C02F 103/08* (2006.01)
*C02F 103/10* (2006.01)

(52) U.S. Cl.
CPC ............... *B01D 63/12* (2013.01); *C02F 1/44* (2013.01); *C02F 1/441* (2013.01); *C02F 1/442* (2013.01); *B01D 61/025* (2013.01); *B01D 61/027* (2013.01); *B01D 2311/14* (2013.01); *B01D 2311/16* (2013.01); *B01D 2317/04* (2013.01); *B01D 2317/08* (2013.01); *C02F 1/444* (2013.01); *C02F 2101/101* (2013.01); *C02F 2103/08* (2013.01); *C02F 2103/10* (2013.01); *C02F 2209/05* (2013.01); *C02F 2209/40* (2013.01); *C02F 2301/043* (2013.01); *C02F 2303/10* (2013.01); *Y02W 10/30* (2015.05)

(56) References Cited

U.S. PATENT DOCUMENTS

| | | | |
|---|---|---|---|
| 6,183,648 B1 * | 2/2001 | Kozak et al. | 210/651 |
| 6,468,431 B1 * | 10/2002 | Oklelas, Jr. | 210/652 |
| 2006/0157410 A1 * | 7/2006 | Hassan | 210/637 |
| 2007/0199878 A1 * | 8/2007 | Eisberg et al. | 210/321.8 |

FOREIGN PATENT DOCUMENTS

| | | |
|---|---|---|
| WO | WO 2005/119007 A1 | 12/2005 |
| WO | WO 2007/138327 A1 | 12/2007 |
| WO | WO 2007/144591 A1 | 12/2007 |
| WO | WO 2008/029124 A1 | 3/2008 |
| WO | WO 2009/151174 A1 | 12/2009 |

OTHER PUBLICATIONS

O'Donnell, K., et al; "Membrane Technology Works on North Sea Platform"; Oil and Gas Journal, vol. 94, No. 49, whole document (1996) XP000685103.

* cited by examiner

PROCESS OF SUPPLYING WATER OF CONTROLLED SALINITY

This application is a divisional of application Ser. No. 13/519,057 filed Jun. 25, 2012, pending, which is a 371 of PCT/GB2011/000032 filed Jan. 11, 2011 which claims priority to European Patent Application No. 10250063.4 filed Jan. 14, 2010, the entire contents of each of which are hereby incorporated by reference.

The present invention relates to a process of providing a low salinity injection water for an oil reservoir having a sufficient salinity to avoid formation damage and a sufficiently low sulfate anion concentration to avoid souring of the reservoir, and to a desalination system for producing such an injection water. In particular, the present invention provides a process and system for producing water of controlled low salinity, controlled sulfate anion concentration and controlled multivalent cation concentration.

BACKGROUND OF THE INVENTION

As described in International patent application WO 2008/029124, it is known to inject water of low salinity into an oil-bearing formation of a reservoir in order to enhance the recovery of oil from the reservoir.

A problem associated with low salinity water-flooding is that desalination techniques may yield water having a salinity lower than the optimal salinity for enhanced oil recovery. Indeed, the desalinated water may be damaging to the oil-bearing rock formation of the reservoir and inhibit oil recovery, for example, by causing swelling of clays in the formation. There is an optimal salinity for the injection water that provides the benefit of enhanced oil recovery whilst avoiding formation damage, and, the optimum value will vary from formation to formation. Typically, where an oil-bearing formation comprises rock that contains high levels of swelling clays, formation damage may be avoided when the injection water has a total dissolved solids content (TPS) in the range of 500 to 5,000 ppm, preferably, 1,000 to 5,000 ppm.

However, it is not desirable to mix a desalinated water of low multivalent cation content with a high salinity water such as seawater owing to the high sulfate anion content and/or high multivalent cation content of the high salinity water. Thus, the high sulfate anion content of the such mixed water streams may result in reservoir souring and/or the precipitation of unacceptable levels of insoluble mineral salts (scale formation) when the injected water contacts precipitate precursor cations such as barium, strontium and calcium cations that are commonly present in the connate water of the formation. In addition, mixing of desalinated water with a high salinity water such as seawater may result in the mixed water stream containing unacceptable levels of multivalent cations, in particular, calcium and magnesium cations. Thus, in order to achieve incremental oil recovery with a low salinity injection water, the ratio of the concentration of multivalent cations in the low salinity injection water to the concentration of multivalent cations in the connate water of the reservoir should be less than 1, preferably, less than 0.9, more preferably, less than 0.8, in particular, less than 0.6, for example, less than 0.5.

As described in International patent application WO 2007/138327, one way in which the salinity of a water supply of overly low salinity might be increased is by blending with water of higher salinity. According to WO 2007/138327, this may be achieved by the steps of:

substantially desalinating a first feed supply of water to provide a first supply of treated water of low salinity;
treating a second feed supply of water to provide a second supply of treated water having a reduced concentration of divalent ions in comparison to the second feed supply and a higher salinity than the first supply of treated water; and
mixing the first supply of treated water and the second supply of treated water to provide a supply of mixed water having a desired salinity suitable for injection into an oil bearing reservoir.

In preferred embodiments of the invention of WO 2007/138327, the first feed supply is substantially desalinated by a reverse osmosis process while the step of treating the second feed supply of water is preferably performed by nanofiltration.

Nanofiltration is commonly used in the oil industry to remove sulfate ions from a source water. The treated water can then be injected into a formation without the risk of forming unacceptable levels of insoluble mineral salts when the injected water contacts precipitate precursor cations present in the connate water of the formation. The invention of WO 2007/13832 therefore permits the supply of a mixed water having the desired salinity suitable for injection into the oil bearing reservoir and having a reduced level of sulfate anions thereby mitigating the risk of mineral scale precipitation either within the formation or in production wells.

It is known that injection of a water that contains high levels of sulfate anions can stimulate the growth of sulfate reducing bacteria that produce hydrogen sulfide as a metabolite resulting in souring of a reservoir. Where it is desired to mitigate the risk of mineral scale formation, the Level of sulfate anions in the supply of mixed water should be less than 40 ppm. However, where it is desired to mitigate the risk of souring in a reservoir, the level of sulfate anions in the supply of mixed water should be as low as possible, for example, less than 7.5 ppm, preferably, less than 5 ppm.

SUMMARY OF THE INVENTION

It has now been found that it is necessary to carefully control the operating conditions of the process of WO 2007/138327 in order to achieve a supply of mixed water of the desired total dissolved solids content for controlling formation damage and of the desired low sulfite anion concentration for controlling reservoir souring.

The present invention is therefore concerned with an improved process and plant for providing a mixed water stream of controlled salinity, and controlled low sulfate anion content for use as injection water for a low salinity waterflood whilst mitigating the risk of formation damage, and controlling sousing in the reservoir.

Thus, according to a first embodiment of the present invention there is provided a process of producing an injection water stream of controlled salinity and controlled sulfate anion concentration that is suitable for injection into an oil bearing formation of an oil reservoir, the process comprising the steps of:
feeding a source water having a total dissolved solids content in the range of 20,000 to 45,000 ppm and a sulfate anion concentration in the range of 1,000 to 4,000 ppm, preferably, 1,500 ppm to 4,000 ppm to a desalinate plant that comprises a plurality of reverse osmosis (RO) membrane units and a plurality of nanofiltration (NF) membrane units wherein the source water is pressurised to a pressure in the range of 350 to 1250 psi absolute, and dividing the source water to provide a feed water for the RO membrane units (hereinafter "RO feed water") and a feed water for the NF membrane units (hereinafter "NF feed water");

if necessary, increasing the pressure of the RO feed water to a value in the range of 900 to 1250 psi absolute before introducing the RO feed water to the RO membrane units and withdrawing an RO permeate and an RO retentate from the RO membrane units wherein the RO membrane units are operated in either a single-pass, single-stage mode or in a single-pass, two-stage mode and wherein the recovery of RO permeate is in the range of 35 to 75% by volume, preferably, 35 to 60% by volume based on the volume of the RO feed water that is fed to the RO membrane units such that the RO permeate has a total dissolved solids contents of less than 250 ppm, and a sulfate anion concentration of less than 3 ppm; if necessary, reducing the pressure of the NF feed water to a value in the range of 350 to 450 psi absolute before introducing the NF feed water to the NF membrane units and withdrawing an NF permeate and NF retentate from the NF membrane units wherein the NF membrane units are operated in a single-pass, single-stage mode and wherein the NF membrane units are operated with a recovery of NF permeate in the range of 35 to 60% by volume based or the volume of the NF feed water that is fed to the NF membrane units such that the NF permeate has a total dissolved solids content in the range of 5,000 to 40,000 ppm, preferably, 15,000 to 35,000 ppm, and a sulfate anion concentration of less than 40 ppm, preferably less than 30 ppm; and mixing at least a portion of the RO permeate and at least a portion of the NF permeate in a ratio in the range of 2:1 to 40:1, preferably, 4:1 to 27:1, in particular, 10:1 to 25:1 to provide an injection water having a total dissolved solids content in the range of 500 to 5,000 ppm, preferably, 1,000 to 5,000 ppm, and a sulfate anion concentration of less than 7.5 ppm, preferably, less than 5 ppm, more preferably less than 3 ppm.

The source water may seawater, estuarine water, a produced water, an aquifer water, or a waste water.

Preferably, the total dissolved solids content (TPS) of the RO permeate is in the range of 50 to 225 ppm, more preferably, 100 to 225 ppm, most preferably, 125 to 200 ppm, in particular, 150 to 175 ppm.

Preferably, the sulfate anion concentration of the RO permeate is in the range of 0.5 to 2.5 ppm, in particular, 0.5 to 1.5 ppm.

Preferably, the TDS of the NF permeate is not more than 15,000 ppm less, preferably not more than 10,000 ppm less than the TDS of the source water.

Preferably, the sulfate anion concentration of the NF permeate is in the range of 10 to 28 ppm, more preferably 10 to 25 ppm, in particular, 15 to 20 ppm.

The sulfate anion concentration of the injection water will be dependent upon the desired total dissolved solids content (TDS) for this stream and hence the mixing ratio for the RO permeate and NF permeate. Thus, the sulfate anion concentration of the injection water will increase with increasing amounts of NF permeate in the mixed stream. Typically, the sulfate anion concentration for an injection water stream having a total dissolved solids content of 1000 ppm is in the range of 1 to 2 ppm, and the values for the range for the sulfate anion concentration should be scaled for injection waters of higher TDS.

An advantage of the process of the present invention is that in addition to providing an injection water having a sufficiently high TDS to mitigate the risk of formation damage and having a sufficiently low sulfate concentration to mitigate the risk of souring in the reservoir, depending upon the choice of the source water, the injection water may also have sufficiently low multivalent cation concentration for use as a low salinity injection water thereby achieving incremental oil recovery from the reservoir.

Accordingly, the present invention is also concerned with an improved process and plant for providing a mixed water stream of controlled salinity, controlled low sulfate anion concentration and controlled multivalent cation concentration for use as injection water for a low salinity waterflood whilst mitigating the risk of formation damage, and controlling souring in the reservoir.

Thus, in a second embodiment of the present invention, there is provided a process of producing an injection water stream of controlled salinity, controlled sulfate anion concentration and controlled multivalent cation concentration that is suitable for injection into an oil bearing formation of an oil reservoir, the process comprising the steps of: feeding a source water having a total dissolved solids content in the range of 20,000 to 45,000 ppm, a sulfate concentration in the range of 1,000 to 4,000 ppm, preferably, 1,500 ppm to 4,000 ppm, and a multivalent cation concentration in the range of 700 to 3,000 ppm, preferably 1,000 to 3,000 ppm, more preferably, 1,500 to 2,500 ppm to a desalination plant that comprises a plurality of reverse osmosis (RO) membrane units and a plurality of nanofiltration (NF) membrane units wherein the source water is pressurised to a value in the range of 350 to 1250 psi absolute, and dividing the source water to provide an RO feed water and an NF feed water;

if necessary, increasing the pressure of the RO feed water to a value in the range of 900 to 1250 psi absolute before introducing the RO feed water to the RO membrane units and withdrawing an RO permeate and an RO retentate from the RO membrane units wherein the RO membrane units are operated in either a single-pass, single-stage mode or in a single-pass, two-stage mode and wherein the recovery of RO permeate is in the range of 35 to 75% by volume, preferably, 35 to 65% by volume based on the volume of the RO feed water that is fed to the RO membrane units such that the RO permeate has a total dissolved solids contents of less than 250 ppm, a sulfate anion concentration of less than 3 ppm, and a multivalent cation content of up to 10 ppm;

if necessary, reducing the pressure of the NF feed water to a value in the range of 350 to 450 psi absolute before introducing the NF feed water to the NF membrane units and withdrawing an NF permeate and an NF retentate from the NF membrane units wherein the NF membrane units are operated in a single-pass, single-stage mode with a recovery of NF permeate in the range of 35 to 60% by volume based on the volume of the NF feed water that is fed to the NF membrane units such that the NF permeate has a total dissolved solids content in the range of 15,000 to 40,000 ppm, preferably, 15,000 to 35,000 ppm, a sulfate anion concentration of less than 40 ppm, preferably, less than 30 ppm and a multivalent cation content of up to 200 ppm, preferably up to 150 ppm, more preferably up to 100 ppm; and mixing at least a portion of the RO permeate and at least a portion of the NF permeate in a ratio in the range of 2:1 to 40:1, preferably, 4:1 to 27:1, in particular, 10:1 to 25:1 to provide an injection water having a total dissolved solids content in the range of 500 to 5,000 ppm, preferably, 1,000 to 5,000 ppm, a sulfate anion concentration of less than 7.5 ppm, preferably, less than 5 ppm, more preferably less than 3 ppm and a multivalent cation content of up to 50 ppm.

Again, the source water may seawater, estuarine water, a produced water, an aquifer water, or a waste water.

The preferred TDS for the source water, the RO permeate, the NF permeate and the injection water are as given above for the first embodiment of the present invention.

The source water preferably has a calcium cation concentration in the range of 200 to 600 ppm. Preferably, the source water has a magnesium cation concentration in the range of 500 to 2000 ppm.

The preferred concentrations of sulfate anions in the RO permeate, NF permeate and injection water are as given above for the first embodiment of the present invention.

Preferably, the concentration of multivalent cations in the RO permeate is in the range of 1 to 10 ppm, preferably, 1 to 5 ppm, in particular, 1 to 3 ppm.

Preferably, the concentration of multivalent cations in the NF permeate is in the range of 50 to 200 ppm, preferably, 50 to 150 ppm.

The concentration of multivalent cations in the injection water will be dependent upon the desired TDS for this stream and hence the mixing ratio for the RO permeate and NF permeate. Thus, the multivalent cation concentration of the injection water will increase with increasing amounts of NF permeate in the mixed stream. Typically, the multivalent cation concentration for an injection water stream having a total dissolved solids content of 1000 ppm is in the range of 2 to 10 ppm, and the values for the range of multivalent cation concentration should be scaled for injection waters of higher TDS.

As discussed above, where it is desired to achieve incremental oil recovery with a low salinity injection water, the ratio of the multivalent cation concentration of the low salinity injection water to the multivalent cation concentration of the connate water should be less than 1. The multivalent cation concentration of a connate water is typically several times greater than the multivalent cation concentration of the injection water formed by mixing the RO permeate and the NF permeate according to the process of the present invention. Accordingly, the injection water has the desired low salinity and desired low multivalent cation concentration to achieve incremental oil recovery when injected into a hydrocarbon-bearing formation of a reservoir whilst having a sufficient content of total dissolved solids to prevent formation damage and a sufficiently low sulfate concentration to mitigate the risk of souring in the reservoir (as well as mitigating the risk of precipitation of insoluble mineral salts in the formation and/or production wells).

Typically, the formation into which the injection water of controlled salinity (controlled TDS), controlled low sulfate anion concentration and controlled low multivalent cation concentration is injected is an oil-bearing sandstone formation that contains a high content of swelling clays, for example, smectite clays. By high content of swelling clays is meant a content of swelling clays of 10% by weight or greater, for example, a content of swelling clays in the range of 10 to 30% by weight.

Typically, in these first and second embodiments of the present invention, the RO permeate and the NF permeate are mixed in a volume ratio (volume of RO permeate to volume of NF permeate) of 2:1 to 40:1, in particular, 4:1 to 27:1, in particular, 10:1 to 25:1. The person skilled in the art will understand that the particular mixing ratio will depend on a one or more of the following factors:
  (a) the salinity of the source water;
  (b) the sulfate concentration of the source water;
  (c) the multivalent cation concentration of the source water;
  (d) the temperature at which the RO and NF membrane units are operated;
  (e) the percentage volume recovery at which the RO and NF membrane units are operated;
  (f) the desired salinity of the injection water;
  (g) the desired sulfate anion concentration of the injection water; and
  (h) the desired multivalent cation concentration of the injection water.

Factors (f), (g) and (h) are, in turn, dependent on characteristics of the reservoir into which it is desired to inject the treated water such as the amount of swelling clays, the levels of sulfate reducing bacteria, and the multivalent cation concentration of the connate water. Thus, depending on the mixing ratio of the RO permeate to the NF permeate, the injection water stream will have a salinity sufficient to control formation damage, a sufficiently low sulfate concentration to control souring in the oil reservoir, and a sufficiently low multivalent cation concentration that the ratio of the multivalent cation concentration of the injection water to that of the connate water of the formation is less than 1.

Advantageously, the ratio of mixing of the RO permeate and the NF permeate is controlled in accordance with a measured variable. The control may be automatic and a feed-back control system may be employed.

The measured variable may be a property of the injection water, for example, the measured variable may relate to the salinity (TDS content) of the injection water, and preferably is the conductivity of the injection water. The conductivity is a measure of the TDS content of the injection water. Alternatively, or additionally, the measured variable may relate to the concentration of multivalent anions in the injection water or in the NF permeate, or the concentration of selected divalent anions, such as sulfate anions, in the injection water or in the NF permeate. Alternatively, or additionally, the measured variable may relate to the concentration of multivalent cations in the injection water or in the NF permeate, or the concentration of selected multivalent cations, such as calcium cations and/or magnesium cations in the injection water or in the NF permeate.

The flow rate of the injection water stream or of the source water stream may also be controlled in accordance with a measured variable.

By "single-pass, single-stage" mode is meant that the feed water is passed through a plurality of individual membrane units that are arranged in parallel. Thus, a feed water is passed to each of the membrane units and a permeate stream and a retentate stream is removed from each of the membrane units. The permeate streams are then combined to form a combined permeate stream. The percentage recovery of the membrane units when operated in "single-pass, single stage" mode is: [(volume of the combined permeate stream/the volume of the feedwater)×100]. These volumes are determined over a set time period, for example, volume of feed water processed in one day and volume of combined permeate stream produced in one day.

By "single-pass, two stage" mode is meant that that the feed water is fed to the first of two membrane units that are arranged in series with the retentate from the first membrane unit being used as feed water to the second membrane unit in the series. Typically, there may be a plurality of first membrane units that are arranged in parallel and a plurality of second membrane units arranged in parallel. Generally, there will be fewer second membrane units than first membrane units as the second membrane units will process a smaller volume of water over a set time period man the first membrane units. Typically, the permeate streams from the first membrane units are mixed to give a first permeate stream and the retentate streams from the first membrane units are mixed to form a first retentate stream. The first retentate stream is then used as feed water to the plurality of second membrane units that are arranged in parallel. The permeate streams from the second membrane units are then typically mixed to give a second permeate stream. The second permeate stream is then combined with the first permeate stream to give a combined permeate stream. The retentate streams from the second membrane units are typically mixed to give a combined retentate stream that is discharged from the desalination plant. However, there are other ways of combining the various streams when operating a plurality of membrane units in a "single-pass, two stage" mode that are within the common general knowledge of the person skilled in the art.

The percentage recovery of the membrane units when operated in "single pass, two stage" mode is: [(volume of the first permeate stream from the first membrane units+volume of the second permeate stream from the second membrane units)/the volume of the feedwater to the first membrane units))×100]. These volumes are determined over a set time period of, for example, one day.

The NF membrane units are preferably operated in "single-pass, single-stage" mode. The RO membrane units are preferably operated in either "single-pass, single-stage" mode or single pass, two stage" mode, in particular, "single-pass, single-stage" mode.

In the present invention, the RO membrane units are operated with a pressure differential across the membrane that provides a recovery of RO permeate in the range of 35 to 75% by volume, preferably, 35 to 65% by volume, more preferably, 35 to 60% by volume, most preferably 45 to 55% by volume, in particular, 50 to 55% by volume, based on the volume of the RO feed water.

Typically, the pressure differential across the RO membrane units (pressure of the RO feed water-pressure of the combined RO retentate) is in the range of 25 to 100 psi, preferably 35 to 75 psi, for example, about 50 psi. Accordingly, the retentate streams that exit the RO membrane units are at a relatively high pressure. Preferably, some or all of the RO retentate streams that are to be discharged from the RO membrane units may be combined and the resulting combined RO retentate stream is passed through a hydraulic recovery unit, for example, a hydraulic recovery turbine or a turbocharger that is coupled to a booster pump for the RO feed water. Thus, the hydraulic recovery unit recovers energy from the RO retentate unit and uses this recovered energy to boost the pressure of the RO feed water thereby reducing the power requirements for the desalination plant. Typically, the pressure of the combined RO retentate stream downstream of the hydraulic recovery unit is less than 100 psig, preferably, in the range of 10 to 75 psig, in particular, 20 to 55 psig, for example, 10 to 50 psig.

In the present invention, the NF membrane units are operated with a pressure differential across the membrane that provides a recovery of NF permeate in the range of 35 to 60% by volume, preferably 45 to 55% by volume, in particular, about 50% by volume, based on the volume of the NF feed wafer.

Typically, the pressure differential across the NF membrane units (pressure of the NF feed water-pressure of the NF retentate) is in the range of 25 to 100 psi. Accordingly, the pressure of the combined NF retentate stream is typically too low to warrant recovering energy from this stream. However, if desired energy may also be recovered from the NF retentate stream using a hydraulic recovery unit.

Preferably, the desalination plant comprises at least two membrane trains, preferably, 2 to 12, more preferably, 2 to 8, for example, 2 to 6, in particular, 4 to 6 membrane trains, wherein each train comprises a plurality of RO membrane units and a plurality of NF membrane units. Typically, the ratio of RO membrane units to NF membrane units in each train is in the range of 2:1 to 40:1, preferably, 4:1 to 27:1, in particular 10:1 to 25:1. Accordingly, an advantage of the desalination plant of present invention is that a separate NF train is eliminated which reduces space and weight considerations, which is of particular concern for offshore facilities where the plant is located on a platform or a Floating Production Storage and Offloading (FPSO) facility. In addition, the incorporation of NF units in each train of the desalination plant of the present invention means that an injection water of the desired composition remains available even if one or more of the trains of the desalination plant is out of action for cleaning, maintenance, or the event of an emergency.

Each train may be provided with dedicated pumping systems and, optionally, dedicated hydraulic recovery systems. Alternatively, there may be a common pumping system and, optionally, a common hydraulic recovery system, for the plurality of trains.

Preferably, the membrane units of each train are arranged in a plurality of rows or racks. In order to reduce the footprint of the desalination plant, it is preferred that these rows are arranged one above another. Preferably, each membrane train comprises between 3 to 15 rows, preferably, between 6 to 12 rows. Generally, there are between 4 and 16 membrane units, preferably, between 6 to 12 membrane units in each row. Typically, the NF membrane units are arranged together, for example, all or a portion of the membrane units of one or more of the rows may be NF membrane units. Where the RO membrane units are operated in "single-pass, two-stage" mode, it is preferred that the first membrane units in the series are arranged together in one or more rows and the second membrane units in the series are also arranged together in one or more rows.

Preferably, the membranes of the NF and RO membrane units are spiral wound membranes. Spiral wound membranes typically have a length in range of 40 to 60 inches (1.8 to 1.52 meters) and an external diameter in the range of 2.5 to 18 inches (6.36 to 45.7 cm).

The NF membrane units and the RO membrane units of each train comprise a plurality of pressure containment housings that contain at least one membrane, preferably, 4 to 8 membranes. The housings may be formed from glass reinforced resin or from steel. Typically, each housing can withstand a pressure in excess of 1100 psi absolute, preferably in excess of 1300 psi absolute, in particular, in excess of 1400 psi absolute. Typically, the housings are cylindrical in shape and are arranged parallel to one another, in rows (or racks), with the longitudinal axes through the housings lying in a substantially horizontal plane.

In a first preferred aspect of the present invention, the source water may be pressurised to the desired feed pressure for the RO membrane units of each train, for example, using a high pressure pump. The source water is then divided to provide the RO feed water for the 80 membrane units and the NF feed water for the NF membrane units. Where the RO membrane units of the train are operated in single-pass, two stage mode, the desired feed pressure for the RO membrane units refers to the pressure at which the first membrane units of the series are operated.

Typically, for tins first preferred aspect of the present invention, each membrane train is provided with a feed header for the RO feed water, a feed header for the NF feed water, a retentate header for a combined retentate stream and a permeate header for a combined permeate stream. The RO feed header and NF feed header are in fluidic communication with a feed line for the source water. Where a row contains only RO membrane units or only NF membrane units, a common feed line is provided leading from the appropriate feed header (RO feed header and NF feed header respectively) to the individual membrane units of each row. Similarly, a common retentate flow line and a common permeate flow line lead from the individual membrane units of each row to the retentate and permeate headers respectively. Where a row contains both RO and NF membrane units, a dedicated common feed line is provided for the RO membrane units leading from the RO feed header and a further dedicated common feed line tor the NF membrane units leading from the NF feed header. In a similar manner, the RO and NF membrane units of the row may be provided with dedicated common retentate lines and dedicated common permeate flow lines.

A flow controller may be provided in the or each common NF feed line so as to control the split of the source water between the RO membrane units and the NF membrane units. As discussed above, the inlet or feed pressure for the NF units is in the range of 350 to 450 psi absolute, in particular, 380 to 420 psi absolute, for example, about 400 psi absolute. Where the pressure of the source water is above the desired inlet pressure for the NF membrane units, a pressure let down valve may be provided in the or each common NF feed line such may the pressure may be reduced to the desired inlet pressure. Alternatively, a control valve may be provided in the or each feed line for the NF membrane units wherein the control valve regulates the flow of the source water to the NF membrane units and also lets down the pressure of the source water to the desired inlet pressure for the NF membrane units. It is also envisaged that a flow controller may be provided upstream of the NF feed header thereby controlling the split of the source water between the RO feed header and the NF feed header and hence the split of the source water between the RO membrane units and NF membrane units. If necessary, a pressure let-down valve may also be provided upstream of the NF feed header. Alternatively, a control valve of the type described above may be provided upstream of the NF feed header.

In second preferred aspect of the present invention, the source water may be at a pressure below the desired inlet pressure for the RO membrane units. It is therefore necessary to boost the pressure of the RO feed water using a booster pump. Preferably, the booster pump is coupled to a hydraulic recovery system that recovers energy from the combined retentate stream that exits the RO membrane units. This hydraulic recovery system may be a hydraulic turbine. Thus, a shaft of the turbine may drive a shaft of the booster pomp. These shafts may be connected via a gear system. However, the person skilled in the art will understand that additional energy must be supplied to the booster pump if the RO feed water is to reach the desired inlet pressure for the RO membrane units.

Typically the source water is pressurised to a value in the range of 350 to 1100 psi absolute prior to being divided to provide the RO feed water and NF feed water. It is preferred to pressurise the source water to a value above the inlet pressure for the NF membrane units prior to dividing the source water to give the RO and NF feed waters. Thus, it is preferred that the pressure of the source water is in the range of 600 to 1100 psi absolute, preferably 700 to 900 psi absolute.

In this second preferred aspect of the present invention, each membrane train is provided with a first feed header for the RO feed water (which has been boosted in pressure to a pressure in the range of 900 to 1250 psi absolute), a second feed header for the NF feed water (which has typically been let down in pressure to a pressure in the range of 350 to 450 psi absolute), a retentate header for a combined retentate stream and a permeate header for a combined permeate stream. Where a row contains only RO membrane units, a common feed line is provided leading from the RO feed header to the individual RO membrane units of each row. Similarly, a common retentate flow line and a common permeate flow line leads from the individual RO membrane units of each row to the retentate and permeate headers respectively. Where a row contains NF membrane units, a common feed line Is provided for the NF membrane units leading from the NF feed header. Similarly, the NF membrane units of the row are provided with common retentate and common permeate flow lines that lead to the retentate and permeate headers respectively. Where a row contains both NF membrane units and RO membrane units, a dedicated common RO feed line, a dedicated common RO retentate line and a dedicated common RO permeate line are provided for the RO membrane units. Similarly, a dedicated common NF feed line, a dedicated common NF retentate line and a dedicated common NF permeate line are provided for the NF membrane units.

In a similar manner to the first preferred aspect of the present invention, a flow controller is typically provided so as to control the split of the source water between the RO feed header and the NF teed header. Typically, a pressure let down valve is provided upstream of the NF feed header such that the pressure may be let down to the desired inlet pressure for the NF membrane units. However, it is also envisaged that a pressure let down valve may be provided in the or each common NF feed line. Alternatively, as described above, a control valve may be provided upstream of the NF feed header thereby controlling both the split of the source water and the pressure of the NF feed water.

The provision of NF membrane units in each train of the desalination plant allows the plant to continue to operate and produce water of the desired salinity, sulfate anion concentration and multivalent cation concentration in the event that it becomes necessary to shut down one or more of the trains for maintenance or cleaning.

Typically, the membrane(s) contained in each membrane unit in a row are provided with water tight pressure fittings for connection to (i) the common feed line, (ii) the common permeate flow line and (iii) the common retentate feed line.

Suitably, a back pressure valve is provided on the or each common NF permeate flow line upstream of the mixing point for the NF permeate and RO permeate. Alternatively, where there is more than one common NF permeate line, these lines may lead to a combined NF permeate line and the backpressure valve may be provided in this combined NF permeate line. The back-pressure valve ensures that the pressure of the NF permeate is sufficiently above the pressure of the RO permeate to allow the NF permeate to be injected into the permeate header. The resulting mixed permeate stream is the injection water stream that then enters an injection water flow line. Suitably, the back-pressure valve opens when the pressure of the NF permeate exceeds a pre-set pressure and allows sufficient flow of NF permeate through the valve to maintain the pressure of the NF permeate at above the pre-set pressure. Typically, the pre-set pressure of the back-pressure valve is at least 5 psi higher than the pressure of the RO permeate. Generally, the pressure of the RO permeate, will be in the range of 10 to 75 psi absolute, preferably, 20 to 55 psi absolute.

Preferably, the source water may have undergone at least one of: filtration to remove particulate matter, chlorine scavenging, dosing with a biocide, dearation, and dosing with a scale inhibitor. These treatments may be performed on the first and/or NF feed waters but in order to reduce space and weight of the plant, it is preferred to perform these treatments on fee source water feed prior to dividing the source water to form the RO feed water and NF feed water.

As an alternative to deaerating the source water upstream of the desalination plant, it is envisaged that a deaerator may be provided downstream of the desalination plant in order to control corrosion in the injection lines, injection pumps and injection wells. An advantage of providing a downstream deaerator is feat the volume of water that is deaerated is substantially less than if the deaerator was arranged upstream of the desalination plant. However, having a deaerator upstream of the desalination plant reduces the risk of corrosion within the desalination plant and therefore allows for the use of cheaper steels. It may therefore be advantageous to provide a deaerator upstream of the desalination plant.

In a further embodiment of the present invention there is provided a desalination plant comprising a plurality of trains each comprising a plurality of RO membrane units and a plurality of NF membrane unite wherein the ratio of RO membrane units to NF membrane units in each membrane train is in the range of 2:1 to 40:1, preferably, 4:1 to 27:1, in particular 10:1 to 25:1, and wherein each membrane train is provided with:
(a) a feed line for a source water wherein the feed line divides to provide a feed line (or header) for the RO membrane units and a feed line (or header) for the NF membrane units,
(b) a permeate line (or header) for the RO membrane units and a permeate line (or header) for the NF membrane units wherein the permeate lines combine to provide an injection water line;
(c) a retentate line (or header) for the RO membrane units and a retentate line (or header) for the NF membrane units; and
(d) a flow controller and pressure let-down valve on the NF feed line.

As discussed above, it is envisaged that flow controller and a pressure let-down valve may be combined in the form of a control valve.

Preferably, the membrane units are arranged in rows placed one above the other. Preferably, the NF membrane units are arranged together in one or more rows. Typically, each membrane train comprises between 3 and 15 rows with each row comprising between 4 and 16 membrane units.

Preferably, a booster pump is provided on the RO feed line and a hydraulic recovery unit on the RO retentate line wherein the hydraulic recovery unit is coupled to the booster pump. Typically, the hydraulic recovery unit is a hydraulic turbine of the type described above. Alternatively, the hydraulic recovery unit may be a turbocharger.

The capacity of the desalination plant should be sufficient to meet the low salinity injection water requirements for the oil reservoir. Typically, each train of the desalination plant is capable of producing between 20,000 and 200,000 bbls of water per day, for example, 40,000 and 60,000 bbls of water per day of the desired low salinity and desired low sulfate anion concentration.

Preferably, a back-pressure valve is provided on the NF permeate line(s) so as to allow accurate metering of the NF permeate into the RO permeate thereby resulting in the production of an injection water having the desired characteristics, e.g. desired controlled salinity, desired sulfate anion concentration and desired multivalent cation concentration.

BRIEF DESCRIPTION OF THE DRAWING

The present invention will now be described with reference to the following Examples and Figures, in which.

DETAILED DESCRIPTION OF THE INVENTION

Figure 1:
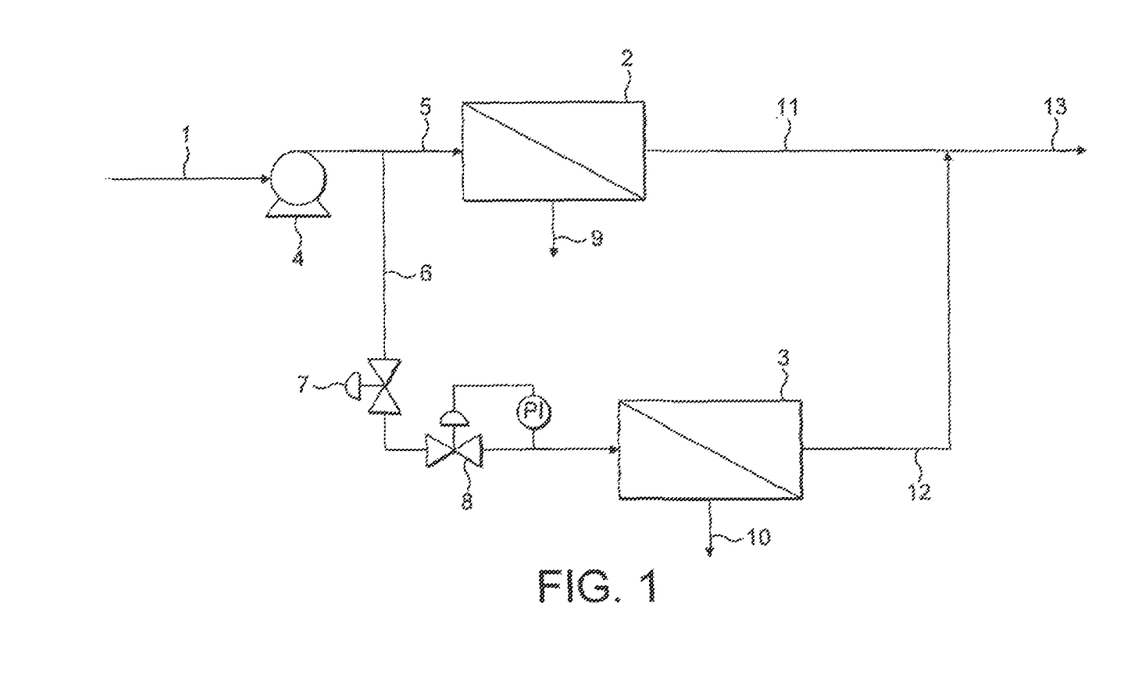
FIG. 1 is a schematic diagram of the process and desalination plant of the present invention.

In FIG. 1, a feed of source water 1 for a desalination plant that comprises a plurality of RO membrane units (shown schematically at 2) and a plurality of NF membrane units (shown schematically at 3) is supplied to a pump 4 that increases the pressure of the source water 1 to a desired value in the range of 900 to 1250 pounds per square inch absolute (psi absolute). Preferably, the source water has been treated upstream of the pump 4. Thus, the source water may be chlorinated, strained and passed through a filtration system to remove particulate matter down to a desired level, typically to a level commensurate with a Silt Density Index (SDI 15 minutes) of less than 5 and preferably less than 3. The SDI reduction can be achieved using a variety of well understood methods including microfiltration, ultrafiltration, media filter systems and cartridge filtration. The filtrate may be dosed with a chlorine scavenger downstream of the filtration system, to remove any residual free chlorine that could otherwise damage the membranes of the membrane units that are disposed downstream of the pump 4. The source water may also be passed through a deaerator to remove oxygen thereby controlling corrosion in the desalination plant and downstream of the desalination, plant, for example, in injection lines, injection pumps, and injection wells. If desired, the source water may also be dosed with a biocide upstream of pump 4 in order to control biological activity which might otherwise occur in the system. Scale inhibitor may also be closed into the source water upstream of the pump 4 in order to minimise sealing on the downstream membrane surfaces.

The source water 1 is divided-downstream of pump 4 to provide an RO feed water 5 for the plurality of RO membrane units 2 and an NF feed water 6 for the plurality of NF membrane units 3. Preferably, these membrane units are arranged in one or more membrane trains which are described in more detail below by reference to FIG. 3. The split of the RO feed water 5 and NF feed water 6 is controlled by flow controller 7. The pressure of the NF feed water 6 is then reduced to a value in the range of 350 to 450 psi absolute via a pressure let-down valve 8 prior to being fed to the NF membrane units 3. The RO retentate 9 removed from the RO membrane units 2 and the NF retentate 10 removed from the NF membrane units 3 are rejected while the RO permeate 11 removed from the RO membrane units 2 and the NF permeate 12 removed from the NF membrane units 3 are combined to provide an injection water 13 of controlled salinity and controlled sulfate anion concentration.

Figure 2:
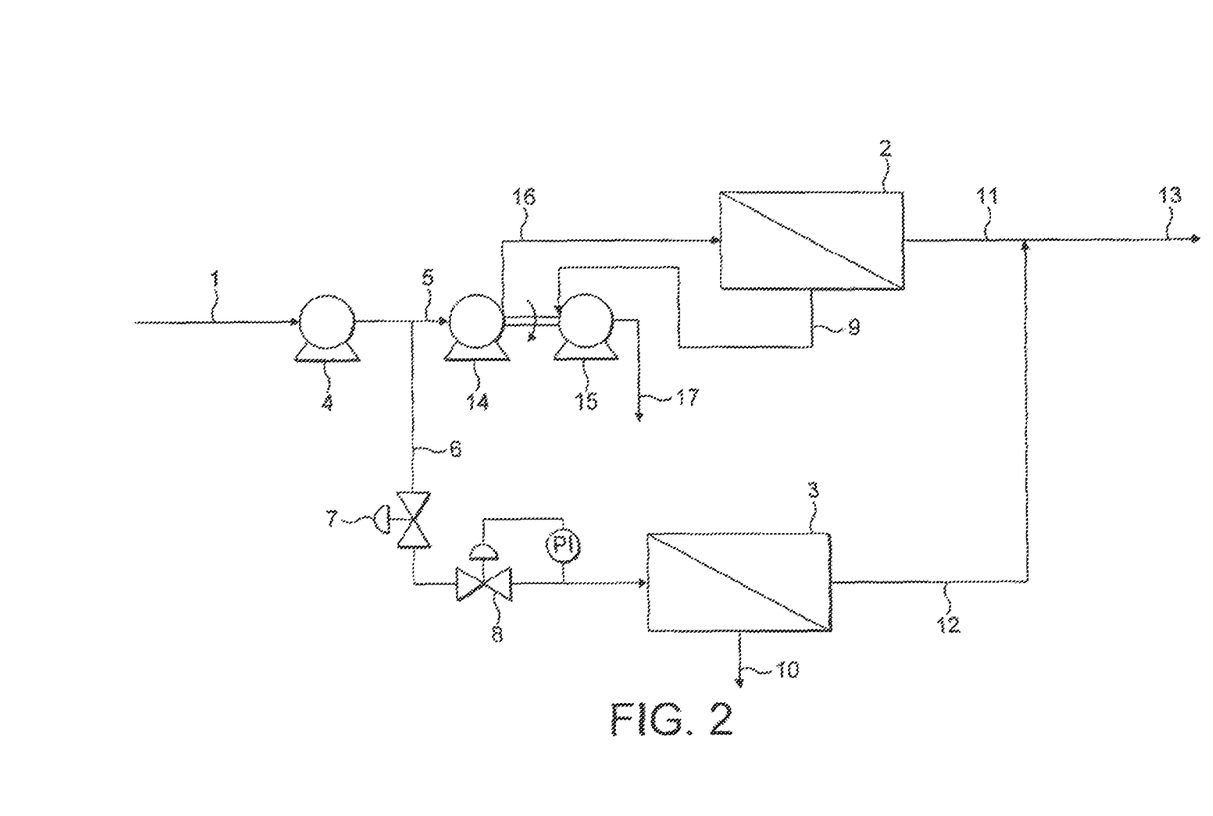
FIG. 2 is a schematic diagram of a modification of the process and desalination plant of the present invention.

FIG. 2 is a modification of the process and desalination plant of FIG. 1 in which pump 4 increases the pressure of the source water to a value of 700 psi absolute before dividing the source water into an RO feed water 5 and an NF feed water 6. The RO feed water 5 for the plurality of RO membrane units 2 is then boosted in pressure to the desired operating pressure of the RO membrane units 2 (1100 psig) using a booster pump 14 thereby generating a pressurised RO feed water 16. A hydraulic recovery turbine 15 is coupled to the booster pump 15 and recovers energy from the retentate 9 that is removed from the RO membrane units 2 thereby generating a reduced pressure retentate 17 that is rejected from the desalination plant. The pressure of the NF feed water 6 is reduced to a value in the range of 350 to 450 psi absolute via a pressure let-down valve 8 as described in respect of FIG. 1.

Figure 3:
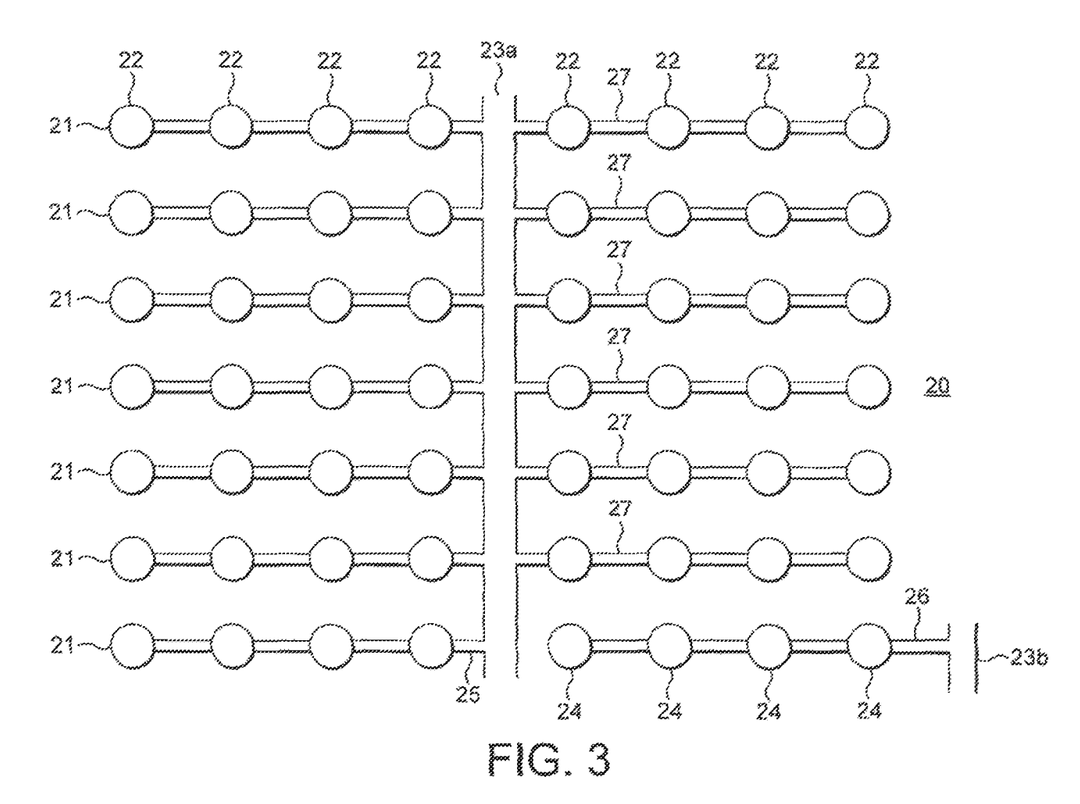
FIG. 3 is a schematic diagram of a train of membrane units for use in the process of the present invention.

FIG. 3 illustrates a transverse cross-section through a membrane train 20 for use in the process and desalination plant of the present invention. The membrane train 28 comprises seven rows 21 with each row comprising eight membrane units 22 arranged in substantially horizontal planes one above another. However, it is envisaged that a membrane train may comprise more than or less than seven rows and that each row may comprise more than or less than eight membrane units. Each of the membrane units comprises a housing that is substantially cylindrical in shape having a length in the range of 35 to 345 inches (0.89 to 8.76 meters), and an internal diameter in the range of 2.5 to 75 inches (6.35 cm to 1.91 meters). The housing contains at least one spiral wound membrane (not shown), preferably, two to four spiral wound membranes, preferably three or four spiral wound membranes. Each of the spiral wound membranes are wound in the form of a cylinder and have a length in range of 30 to 60 inches (0.762 to 1.52 meters) and an external diameter in the range of 2.5 to 18 inches (6.36 to 45.7 cm). A typical membrane has a length of about 40 inches (1.02 meters) and a diameter of about 8 inches (20.3 cm). Where a housing contains more than one membrane, the membranes are typically arranged end to end, in which case the housing generally has an internal diameter of up to 18 inches (45.7 cm) and a length of up to 345 inches (8.76 meters).

The membrane train 20 has a feed header 23*a* for the RO source water and a feed header 23*b* for the NF feed water. The RO feed header 23*a* is typically arranged substantially vertically, at a mid-point of the train such that half of the RO membrane units of each row are arranged on either side thereof. For example, where each membrane row has eight RO membrane units, four RO membrane units may be provided on either side of the RO feed header 23*a*. The majority of the membrane units of the train are reverse osmosis (RO) units and the remainder are nanofiltration (NF) membrane units with the ratio of RO units to NF units being dependent on the desired mixing ratio of RO permeate and NF permeate which in turn is dependent on the % volume recovery of permeate from the RO and NF membrane units. FIG. 3 shows four NF membrane units 24 arranged in the bottom row to the left of the NF feed header 23*b*. However, it is also envisaged that the NF feed header 23*b* may be arranged at the mid-point of the train.

A plurality of common feed lines lead from the feed headers to the rows of the membrane train. Thus, the bottom row is provided with a first common feed line 25 leading from the RO feed header 23*a* to the four RO membrane units arranged to the left of the RO feed header 23*a* and a second common feed line 26 leading from the NF feed header 23*b* to the four NF membrane units 24 arranged to the left of the NF feed header 23*b*. Thus, the water that flows through the second common feed line 26 is the NF water Feed. A flow control valve and pressure let-down valve (not shown) are provided in the second common feed line 26 for reducing the pressure of the NF water feed to the operating pressure of the NF membrane units 24. The pressure let-down valve is controlled via a pressure controller (not shown) such that the pressure of the NF feed water downstream of the valve is in the range of 350 to 430 psi absolute. The NF membrane units 24 are single-pass single-stage units with the retentate from the NF membrane units being rejected by a common retentate reject line (not shown) that leads to an NF retentate header (not shown). The permeate from each NF membrane unit is fed to a common NF permeate line (not shown) that leads to an NF permeate header (not shown).

The remaining rows of the train (the upper six rows) are each provided with a common feed line 27 leading from the RO feed header 23*a* to each of the RO membrane units of the row. Thus, the water that flows through the first common feed line 25 of the bottom row and the common feed lines 27 of the upper six rows is the RO feed water for the RO membrane units. Like the NF membrane units, the RO membrane units shown in FIG. 3 are single-pass single-stage units. However, as discussed above, the RO membrane units of the train may also be single-pass two-stage units. The person skilled in the art would understand how to modify the train of FIG. 3 so that the RO membrane units are operated in single-pass two-stage mode. The retentate from the RO membrane units of each row Is rejected by being fed via a common retentate reject line (not shown) to the RO retentate header (not shown). The NF retentate and RO retentate are optionally combined and are either discharged to the environment, for example, into the sea, or are injected down an injection well either into a hydrocarbon bearing formation or an aquifer. The permeate from the RO membrane units of each row is fed via a common RO permeate line (not shown) to a permeate header (not shown) where it is combined with the NF permeate. The NF permeate line is provided with a hack pressure valve to ensure that the pressure of the NF permeate is sufficiently above that of the RO permeate that the NF permeate cart be metered into the permeate header and mixed with the RO permeate thereby forming the injection water stream.

Example 1

A low salinity injection water stream may be prepared from a source water having a TDS content of 35,800 ppm, a sulfate anion concentration of 2,750 ppm and a multivalent cation concentration (sum of the calcium and magnesium cation concentrations) of 1830 ppm by feeding the source water at a rate of 320 thousand barrels of water per day (mbwd) to a desalination plant comprising a plurality of RO membrane units and a plurality of NF membrane units. The source water feed was divided to provide an RO feed water for the RO membrane units (310 mbwd) and an NF feed water for the NF membrane units (10 mbwd). The RO membrane units were operated at a pressure of 1000 psi absolute and a recovery of 50% by volume to provide 155 mbwd of an RO permeate stream having a TDS of 177 ppm, a sulfate anion concentration of 1.5 ppm and a multivalent cation concentration of 2.5 ppm. The NF feed water for the NF membrane units was reduced in pressure via a pressure let down valve to a pressure of 400 psi absolute (the operating pressure of the NF membrane units). The NF membrane units were operated at a recovery of 50% by volume to provide 5 mbwd of an NF permeate stream having a total dissolved solids content of 26,500 ppm, a sulfate concentration of 25 ppm and a multivalent cation concentration of 132 ppm. The NF permeate stream and RO permeate stream were combined to give 160 mbwd of an injection water stream having a TDS of 1000 ppm, a sulfate anion, concentration of 2.2 ppm and a multivalent cation concentration of 6.5 ppm (using a blend ratio of RO permeate to NF permeate of 31.0:1).

Example 2

A low salinity injection water stream may be prepared from a source water having a TDS content of 35,800 ppm, a sulfate anion concentration of 2,750 ppm and a multivalent cation concentration (sum of the calcium and magnesium cation concentrations) of 1830 ppm by feeding the source water at a rate of 320 thousand barrels of water per day (mbwd) to a desalination plant comprising a plurality of RO membrane units and a plurality of NF membrane units. The source water feed wag divided to provide an RO feed water for the RO membrane units (261.4 mbwd) and an NF feed water for the NF membrane units (58.6 mbwd). The RO membrane units were operated at a pressure of 1000 psi absolute and a recovery of 50% by volume to provide 130.7 mbwd of an RO permeate stream having a TDS of 177 ppm, a sulfate anion concentration of 1.5 ppm and a multivalent cation concentration of 2.5 ppm. The NF feed water for the NF membrane units was reduced in pressure via a pressure let down valve to a pressure of 400 psi absolute (the operating pressure of the NF membrane units). The NF membrane units were operated at a recovery of 50% by volume to provide 29.3 mbwd of an NF permeate stream having a total dissolved solids content of 26,500 ppm, a sulfate concentration of 25 ppm and a multivalent cation concentration of 132 ppm. The NF permeate stream and RO permeate stream were combined to give 160 mbwd of an injection water stream having a TDS of 5000 ppm, a sulfate anion concentration of 5.8 ppm and a multivalent cation concentration of 26.2 ppm (using a blend ratio of RO permeate to NF permeate of 4.5:1).

The invention claimed is:

1. A desalination plant comprising a filtration system for removing particulate matter from a source water, a plurality of membrane trains, each membrane train comprising a plurality of reverse osmosis (RO) membrane units and a plurality of nanofiltration (NF) membrane units wherein the ratio of RO membrane units to NF membrane units in each membrane train is in the range of 2:1 to 40:1, and wherein each membrane train is provided with:
(a) a feed line for a filtered source water removed from the filtration system wherein the feed line for the filtered source water divides to provide a feed line for the RO membrane units and a feed line for the NF membrane units and wherein a high pressure pump is arranged on the feed line for the filtered source water and, in use, the high pressure pump increases the pressure of the filtered source water to a value in the range of 900 to 1250 psi absolute,
(b) a flow controller and pressure let-down valve on the feed line for the NF membrane units wherein, in use, the pressure let-down valve reduces the pressure in the feed line for the NF membrane units to a value in the range of 350 to 450 psi absolute,
(c) a permeate line for the RO membrane units and a permeate line for the NF membrane units that combine to provide an injection water line;
(d) a back pressure valve on the NF permeate line that, in use, opens when the pressure in the permeate line exceeds a pre-set value that is at least 5 psi higher than the pressure in the RO permeate line, and
(e) a retentate line for the RO membrane units to form a combined RO retentate stream and a retentate line for the NF membrane units.

2. A desalination plant as claimed in claim 1 wherein the desalination plant comprises 2 to 6 membrane trains, each membrane train comprises between 3 to 15 rows and each row comprises between 4 and 16 membrane units and wherein each membrane unit comprises a pressure containment housing that contains at least one membrane.

3. A desalination plant as claimed in claim 2 wherein the desalination plant comprises 2 to 4 membrane trains, each membrane train comprises between 6 to 12 rows and each row comprises between 4 and 16 membrane units.

4. A desalination plant as claimed in claim 1 wherein the NF membrane units and the RO membrane units of each train are single stage units.

5. A desalination plant as claimed in claim 1 wherein the ratio of RO membrane units to NF membrane units in each membrane train is in the range of 4:1 to 27:1.

6. A desalination plant as claimed in claim 1 wherein the RO membrane units are operated with a pressure differential across the membrane that provides a recovery of RO permeate in the range of 35 to 75% by volume based on the volume of the RO feed water.

7. A desalination plant as claimed in claim 6 wherein the recovery of RO permeate is in the range of 50 to 55% by volume based on the volume of the RO feed water.

8. A desalination plant as claimed in claim 1 wherein the pressure differential across the RO membrane units is defined as the pressure of the combined RO retentate stream, and the RO feed water minus the pressure of the combined RO retentate stream, and is in the range of 25 to 100 psi.

9. A desalination plant as claimed in claim 8 wherein the pressure differential across the RO membrane units, is about 50 psi.

10. A desalination plant as claimed in claim 1 wherein the NF membrane units are operated with a pressure differential across the membrane that provides a recovery of NF permeate in the range of 35 to 60% by volume, based on the volume of the NF feed water.

11. A desalination plant as claimed in claim 10 wherein the NF membrane units are operated with a pressure differential across the membrane that provides a recovery of NF permeate in the range of 45 to 55% by volume based on the volume of the NF feed water.

12. A desalination plant as claimed in claim 1 wherein the pressure differential across the NF membrane units is defined as the pressure of the NF feed water minus the pressure of the NF retentate, and is in the range of 25 to 100 psi.

13. A desalination plant as claimed in claim 1 wherein the NF membrane units are arranged together in one or more rows.

14. A desalination plant as claimed in claim 13 wherein each membrane train comprises between 3 and 15 rows with each row comprising between 4 and 16 membrane units.

15. A desalination plant as claimed in claim 1 wherein the flow controller and pressure let-down valve are combined in the form of a control valve.

16. A desalination plant comprising a filtration system for removing particulate matter from a source water, a plurality of membrane trains, each membrane train comprising a plurality of reverse osmosis (RO) membrane units and a plurality of nanofiltration (NF) units wherein the ratio of RO membrane units to NF membrane units in each membrane train is in the range of 2:1 to 40:1, and wherein each membrane train is provided with:
  (a) a feed line for a filtered source water removed from the filtration system wherein the feed line for the filtered source water divides to provide a feed line for the RO membrane units and a feed line for the NF membrane units and wherein a high pressure pump is arranged on the feed line for the filtered source water and, in use, the high pressure pump increases the pressure of the filtered source water to a value of above 450 psi absolute and below 900 psi absolute;
  (b) a booster pump provided on the feed line for the RO membrane units wherein, in use, the booster pump increases the pressure in the feed line for the RO membrane units to a value in the range of 900 to 1250 psi absolute;
  (c) a flow controller and pressure let-down valve on the feed line for the NF units wherein, in use, the pressure let-down valve reduces the pressure in the NF feed line to a value in the range of 350 to 450 psi absolute;
  (d) a permeate line for the RO membrane units and a permeate line for the NF membrane units that combine to provide an injection water line;
  (e) a back pressure valve on the NF permeate line wherein, in use, the back pressure valve opens when the pressure in the NF permeate line exceeds a pre-set value that is at least 5 psi higher than the pressure in the RO permeate line; and
  (f) a retentate line for the RO membrane units to form a combined RO retentate stream and a retentate line for the NF membrane units.

17. A desalination plant as claimed in claim 16 wherein a hydraulic recovery unit is provided on the RO retentate line and wherein the hydraulic recovery unit is coupled to the booster pump on the RO feed line.

18. A desalination plant as claimed in claim 17 wherein the hydraulic recovery unit is a hydraulic turbine having a shaft that is coupled to a drive shaft of the booster pump.

19. A desalination plant as claimed in claim 1 wherein the pressure of the combined RO retentate stream downstream of the hydraulic recovery unit is less than 100 psig.

20. A desalination plant as claimed in claim 19 wherein the pressure of the combined RO retentate stream downstream of the hydraulic recovery unit is in the range of 10 to 75 psig.

21. A desalination plant as claimed in claim 19 wherein the pressure of the combined RO retentate stream downstream of the hydraulic recovery unit is in the range of 20 to 55 psig.

22. A desalination plant as claimed in claim 16 wherein the ratio of RO membrane units to NF membrane units in each membrane train is in the range of 10:1 to 25:1.

\* \* \* \* \*